US012028751B2

(12) United States Patent
Wakao et al.

(10) Patent No.: US 12,028,751 B2
(45) Date of Patent: Jul. 2, 2024

(54) SYSTEM AND METHOD FOR PERFORMING PRIORITY CONTROL IN WIRELESS COMMUNICATION

(71) Applicant: Nippon Telegraph and Telephone Corporation, Tokyo (JP)

(72) Inventors: Keisuke Wakao, Tokyo (JP); Shota Nakayama, Tokyo (JP); Akira Kishida, Tokyo (JP); Kenichi Kawamura, Tokyo (JP); Takatsune Moriyama, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 359 days.

(21) Appl. No.: 17/435,101

(22) PCT Filed: Feb. 25, 2020

(86) PCT No.: PCT/JP2020/007370
§ 371 (c)(1),
(2) Date: Aug. 31, 2021

(87) PCT Pub. No.: WO2020/179533
PCT Pub. Date: Sep. 10, 2020

(65) Prior Publication Data
US 2022/0132370 A1    Apr. 28, 2022

(30) Foreign Application Priority Data
Mar. 1, 2019    (JP) .................................. 2019-037948

(51) Int. Cl.
*H04W 28/06*    (2009.01)
*H04W 24/10*    (2009.01)
(Continued)

(52) U.S. Cl.
CPC .......... *H04W 28/065* (2013.01); *H04W 24/10* (2013.01); *H04W 28/18* (2013.01); *H04W 80/02* (2013.01)

(58) Field of Classification Search
CPC ... H04W 28/065; H04W 24/10; H04W 28/18; H04W 80/02
See application file for complete search history.

(56) References Cited

U.S. PATENT DOCUMENTS

2014/0146764 A1 * 5/2014 Kim ................... H04W 74/006
370/329
2016/0337941 A1 * 11/2016 Andrei ................. H04W 48/08
2021/0195460 A1 * 6/2021 Park .................. H04W 28/0268

OTHER PUBLICATIONS

[No Author Listed], "Part 11: Wireless LAN Medium Access Control (MAC) and Physical Layer (PHY) Specifications," IEEE Approved Draft Standard for Information Technology—Telecommunications and Information Exchange Between Systems—Local and Metropolitan Area Networks—specific requirements, Aug. 2016, P802.11:3774 pages.

* cited by examiner

Primary Examiner — Won Tae C Kim
(74) Attorney, Agent, or Firm — Fish & Richardson P.C.

(57) ABSTRACT

Provided is a wireless communication system that performs priority control by setting, depending on a type of transmission data, a channel use period during which exclusive use of a channel after a right to access the channel is acquired is permitted. The wireless communication system includes a measurement unit that measures quality measurement information related to a quality of wireless communication, a parameter setting unit that makes, when a latency in transmission of a prioritized frame due to transmission of a non-prioritized frame is not expected based on the quality measurement information measured by the measurement unit, settings such that the channel use period for the
(Continued)

transmission of the non-prioritized frame is changed to be longer, and a MAC frame generation unit that generates a MAC frame which permits continuous transmission of the non-prioritized frames within the channel use period set by the parameter setting unit.

6 Claims, 10 Drawing Sheets

(51) Int. Cl.
    *H04W 28/18*     (2009.01)
    *H04W 80/02*     (2009.01)

SYSTEM AND METHOD FOR PERFORMING PRIORITY CONTROL IN WIRELESS COMMUNICATION

CROSS-REFERENCE TO RELATED APPLICATIONS

This application is a National Stage application under 35 U.S.C. § 371 of International Application No. PCT/JP2020/007370, having an International Filing Date of Feb. 25, 2020, which claims priority to Japanese Application Serial No. 2019-037948, filed on Mar. 1, 2019. The disclosure of the prior application is considered part of the disclosure of this application, and is incorporated in its entirety into this application.

TECHNICAL FIELD

The present invention relates to a wireless communication system and a wireless communication method.

BACKGROUND ART

A wireless LAN, which features a broad band and convenience of being able to be installed by anyone, has been widely prevalent as a wireless access means. Typical representative frequencies to be used by the wireless LAN are in a 2.4 GHz band and a 5 GHz band. These frequency bands include the frequencies which require no license, and anyone can install a wireless device and use these frequency bands without applying for a license.

Specifications (NPL 1) of the wireless LAN are developed by the IEEE and, as a wireless access method, CSMA/CA (Carrier Sense Multiple Access/Collision Avoidance) is used. In the CSMA/CA, each of wireless LAN terminals performs carrier sensing before transmission and starts the transmission after recognizing that a channel has not been used for a given period of time. When the channel is in use, the wireless LAN terminal waits until the use of the channel is ended, and then waits for a period obtained by adding, to a predetermined period, a period corresponding to a randomly selected number of slots (random backoff) and, when there is no use of the channel during the period, the wireless LAN terminal transmits a wireless frame.

Thus, the wireless LAN autonomously avoids a collision between the plurality of wireless terminals, and performs the transmission. The transmitted wireless frame has a destination address written therein and, when a wireless LAN device that has received the wireless frame is a destination, immediately after a lapse of a SIFS (Short Inter Frame Space), the wireless LAN device returns an ACK frame. Accordingly, when a transmitted packet could not be delivered for such a reason as radio wave interference, the ACK frame is not returned. Consequently, a transmitter side determines that an error occurred in transmission of the frame and transmits the frame again.

In accordance with a basic transmission operation of the wireless LAN described above, data is transmitted but, since the wireless LAN uses the bands which require no license and frequently undergoes interference, a wait time accounts for a high proportion. In addition, when a MAC (media access control) queue previous to a wireless transmission unit is shared by all the wireless terminals attributed to an AP (access point), it is required to wait until all the wireless frames that have reached the MAC queue earlier are transmitted from the other wireless terminals, and accordingly the wait time is further elongated.

As a result, a communication band for each of the wireless terminals is narrowed by a reduction in time occupancy during which the communication band is usable for wireless communication. In addition, when a required wireless traffic data rate exceeds the band, congestion occurs. A latency required for a wait in the MAC queue is particularly referred to as a queuing latency. It is known that the queuing latency is diffused during the congestion.

In other words, a basic operation of the wireless LAN has a problem in that, when a low-latency service is accepted, it is highly possible that a quality cannot be satisfied due to the queuing latency.

As a solution to this problem, techniques supporting QoS (Quality of Service) of the wireless LAN are included in the specifications (NPL 1) developed by the IEEE. One of the techniques is a function referred to as EDCA (Enhanced Distributed Channel Access). In the EDCA, data sets are categorized into four access categories (hereinafter abbreviated as ACs) AC_VO, AC_VI, AC_BE, and AC_BK, and data sets to be transmitted are assigned to MAC queues corresponding to the individual ACs to be stored therein.

The AC_VO is the audio data access category of which a highest real-time property is required and to which a highest priority is given. The AC_VI is the video data access category to which a higher priority is given. The AC_BE is the best effort data access category to which a lower priority is given. The AC_BK is the background traffic access category to which a lowest priority is given.

In each of the ACs, a total of four parameters (hereinafter referred to as the EDCA parameters) including a maximum interval of time (TxOP Limit) that can continuously be used for wireless communication upon each access and three parameters (AIFS, CWmax, and CWmin) for adjusting an access acquisition probability. The EDCA parameters are wireless LAN parameters which differ from one of the ACs to another. The EDCA parameters have introduced, into the wireless LAN, a mechanism such that the AC having a higher priority is allowed to go through a wait time in a shorter period of time and use a wireless section for a longer period of time.

The four EDCA parameters (a total of sixteen EDCA parameters) set for each of the four ACs have generally known default values. According to the default values, 0 is assumedly set to the TxOP Limit of each of the non-prioritized ACs (AC_BE and AC_BK).

As described above, the TxOP Limit is the parameter for specifying the maximum interval of time that can be used by each of the ACs for wireless communication upon each access in microseconds. However, a meaning of the TxOP Limit is different only when the value thereof is 0, and the TxOP Limit having the value of 0 serves as an identifier that permits only one frame to be wirelessly transmitted upon each access. This operation is intended to maximally narrow a band of the non-prioritized ACs when a wireless traffic of each of the ACs is tightened, but the processing has two problems to be solved.

The first problem lies in that, under any circumstance, the transmission of the non-prioritized frame is required to be performed by single frame transmission in which a MAC efficiency is constantly low and the band is narrow. For the wireless LAN, a technique of performing continuous frame transmission in which the numbers of the ACK frames and the SIFSs are reduced by using an A-MPDU (aggregation MAC protocol data unit), 802.11e Block data frame exchange, or the like to enhance the MAC efficiency and widen the band is included in the specifications developed by the IEEE. The technique is to be used also for wireless communication of the non-prioritized ACs without overloading the band of the prioritized ACs, but cannot be applied thereto since the single frame transmission is forced by the existing default values.

The second problem is that, when wireless terminals belonging to the non-prioritized ACs include one which can perform wireless communication only at a low wireless transmission rate, it becomes difficult to compensate for a band intended by the prioritized ACs. A use period of a wireless section, which is required when TxOP Limit=0 is satisfied, has a value approximate to a value obtained by dividing a transmission frame size (bit) by a wireless transmission rate (bit/s). Accordingly, when the wireless transmission rate is low, even transmission of one frame requires the use period equal to or longer than that required by transmission of the prioritized AC, and consequently the prioritized traffic is likely to be tightened.

CITATION LIST

Non-Patent Literature

[NPL 1] P802. 11-REVmc/D8. 0, August 2016—IEEE Approved Draft Standard for Information technology—Telecommunications and information exchange between systems—Local and metropolitan area networks—Specific requirements Part 11: Wireless LAN Medium Access Control (MAC) and Physical Layer (PHY) Specifications

SUMMARY OF THE INVENTION

Technical Problem

An object of the present invention is to provide a wireless communication system and a wireless communication method which can reduce a latency in transmission of a prioritized frame due to exclusive use of a channel by a non-prioritized frame.

Means for Solving the Problem

A wireless communication system according to an aspect of the present invention is a wireless communication system that performs priority control by setting, depending on a type of transmission data, a channel use period during which exclusive use of a channel after a right to access the channel is acquired is permitted, the wireless communication system including: a measurement unit that measures quality measurement information related to a quality of wireless communication; a parameter setting unit that makes, when a latency in transmission of a prioritized frame due to transmission of a non-prioritized frame is not expected based on the quality measurement information measured by the measurement unit, settings such that the channel use period for the transmission of the non-prioritized frame is changed to be longer; and a MAC frame generation unit that generates a MAC frame which permits continuous transmission of the non-prioritized frames within the channel use period set by the parameter setting unit.

In the wireless communication system according to the aspect of the present invention, the parameter setting unit makes, when the latency in the transmission of the prioritized frame due to the transmission of the non-prioritized frame is expected based on the quality measurement information measured by the measurement unit, settings such that the channel use period for the transmission of the non-prioritized frame is limited to be equal to or shorter than a predetermined period and a limit to the number of frames that can be transmitted within the channel use period is eliminated, and the MAC frame generation unit performs fragmentation processing on the non-prioritized frame.

In the wireless communication system according to the aspect of the present invention, the measurement unit measures, as the quality measurement information, information including at least any of signals respectively representing a surrounding interfering wave, an average packet size of the transmission data, an average required data rate thereof, an average wireless transmission rate thereof, and a communication standard.

A wireless communication method according to the aspect of the present invention is a wireless communication method that performs priority control by setting, depending on a type of transmission data, a channel use period during which exclusive use of a channel after a right to access the channel is acquired is permitted, the wireless communication method including: a measurement step of measuring quality measurement information related to a quality of wireless communication; a parameter setting step of making, when a latency in transmission of a prioritized frame due to transmission of a non-prioritized frame is not expected based on the quality measurement information measured by the measurement step, settings such that the channel use period for the transmission of the non-prioritized frame is changed to be longer; and a MAC frame generation step of generating a MAC frame which permits continuous transmission of the non-prioritized frames within the set channel use period.

In the wireless communication method according to the aspect of the present invention, the parameter setting step includes making, when the latency in the transmission of the prioritized frame due to the transmission of the non-prioritized frame is expected based on the quality measurement information measured by the measurement step, settings such that the channel use period for the transmission of the non-prioritized frame is limited to be equal to or shorter than a predetermined period and a limit to the number of frames that can be transmitted within the channel use period is eliminated, and the MAC frame generation step includes performing fragmentation processing on the non-prioritized frame.

In the wireless communication method according to the aspect of the present invention, the measurement step includes measuring, as the quality measurement information, information including at least any of signals respectively representing a surrounding interfering wave, an average packet size of the transmission data, an average required data rate thereof, an average wireless transmission rate thereof, and a communication standard.

Effects of the Invention

According to the present invention, it is possible to reduce the latency in the transmission of the prioritized frame due to the exclusive use of the channel by the non-prioritized frame.

DESCRIPTION OF EMBODIMENTS

Figure 1:
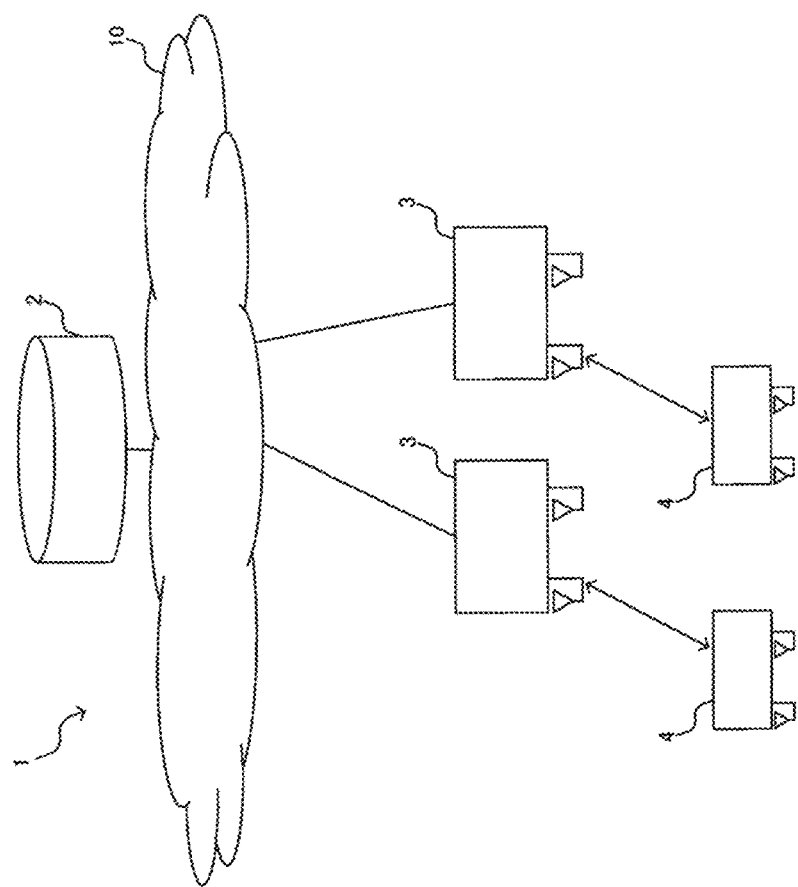
FIG. 1 is a diagram illustrating an example of a configuration of a wireless communication system according to an embodiment.

Referring to the drawings, the following will describe an embodiment of a wireless communication system. FIG. 1 illustrates an example of a configuration of a wireless communication system 1 according to the embodiment. As illustrated in FIG. 1, the wireless communication system 1 is connected to each of a central control station 2 and a plurality of wireless base stations 3 via a network 10. In addition, the wireless base stations 3 perform wireless communication with wireless terminals 4. For example, the wireless communication system 1 is a wireless LAN system which performs wireless communication including priority control based on each of IEEE 802. 11 standards via the wireless base stations 3 each serving as an AP (access point).

Figure 2:
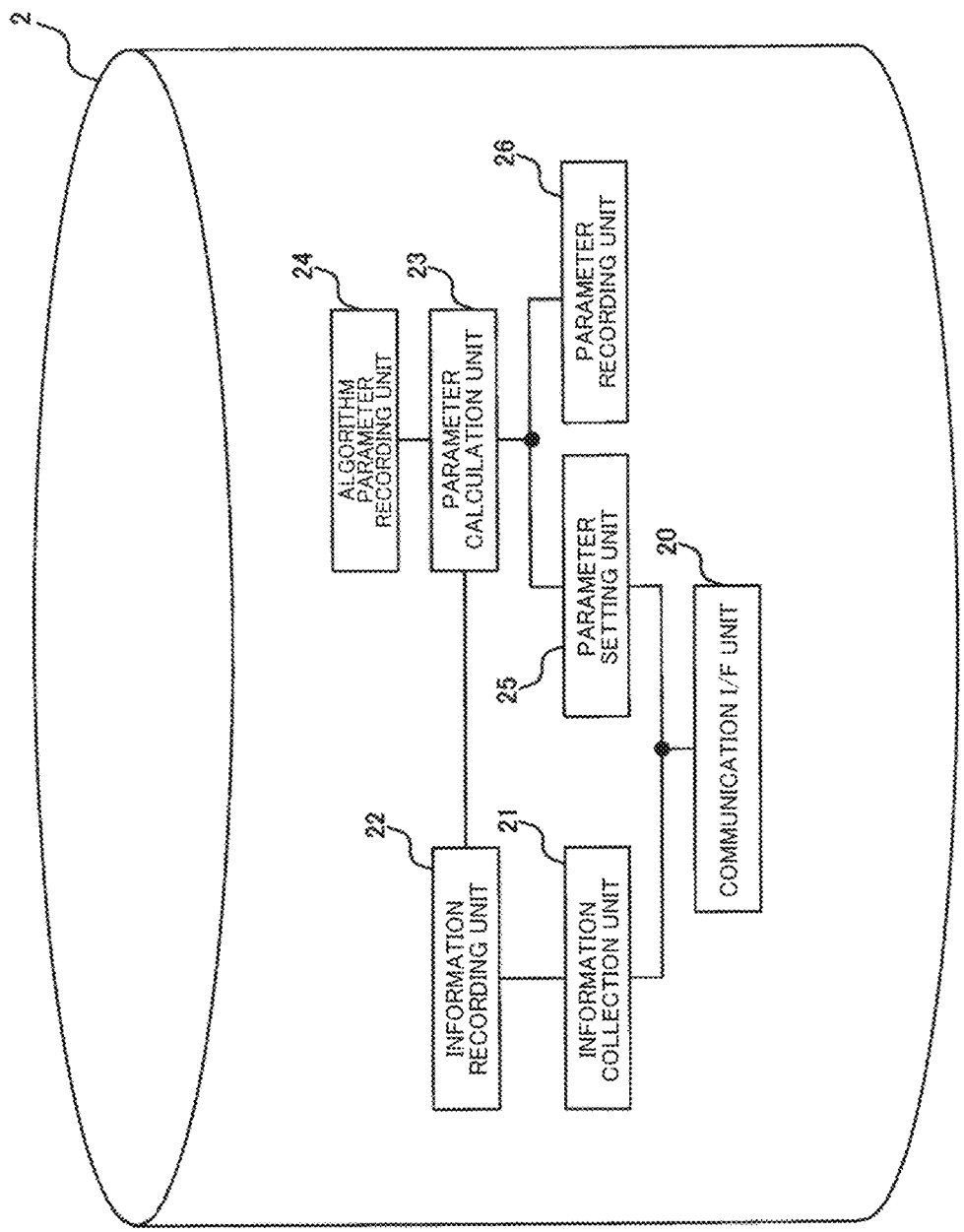
FIG. 2 is a diagram illustrating an example of a configuration of a central control station according to the embodiment.

FIG. 2 illustrates an example of a configuration of the central control station 2 according to the embodiment. As illustrated in FIG. 2, the central control station 2 includes a communication I/F (interface) unit 20, an information collection unit 21, an information recording unit 22, a parameter calculation unit 23, an algorithm parameter recording unit 24, a parameter setting unit 25, and a parameter recording unit 26.

The communication I/F unit 20 is an interface that performs transmission/reception to/from each of the wireless base stations 3 via the network 10 (FIG. 1). For example, the communication I/F unit 20 transmits/receives information related to wireless communication such as communication quality measurement information to be collected by each of the wireless base stations 3 and attribution information representing attribution of the wireless terminals 4 to the wireless base stations 3 as well as wireless LAN parameters.

The information collection unit 21 collects the information related to the wireless communication, such as the communication quality measurement information and the attribution information, via the communication I/F unit 20. The information recording unit 22 records the information related to the wireless communication collected by the information collection unit 21, such as the communication quality measurement information and the attribution information.

The parameter calculation unit 23 refers to the information related to the wireless communication, which is recorded in the information recording unit 22, and algorithm parameters for a wireless LAN recorded by the algorithm parameter recording unit 24 to calculate new wireless LAN parameters.

The parameter setting unit 25 sets, via the communication I/F unit 20, the wireless LAN parameters calculated by the parameter calculation unit 23 to each of the wireless base stations 3. The parameter recording unit 26 records and manages the wireless LAN parameters set by the parameter setting unit 25 to the wireless base station 3.

Figure 3:
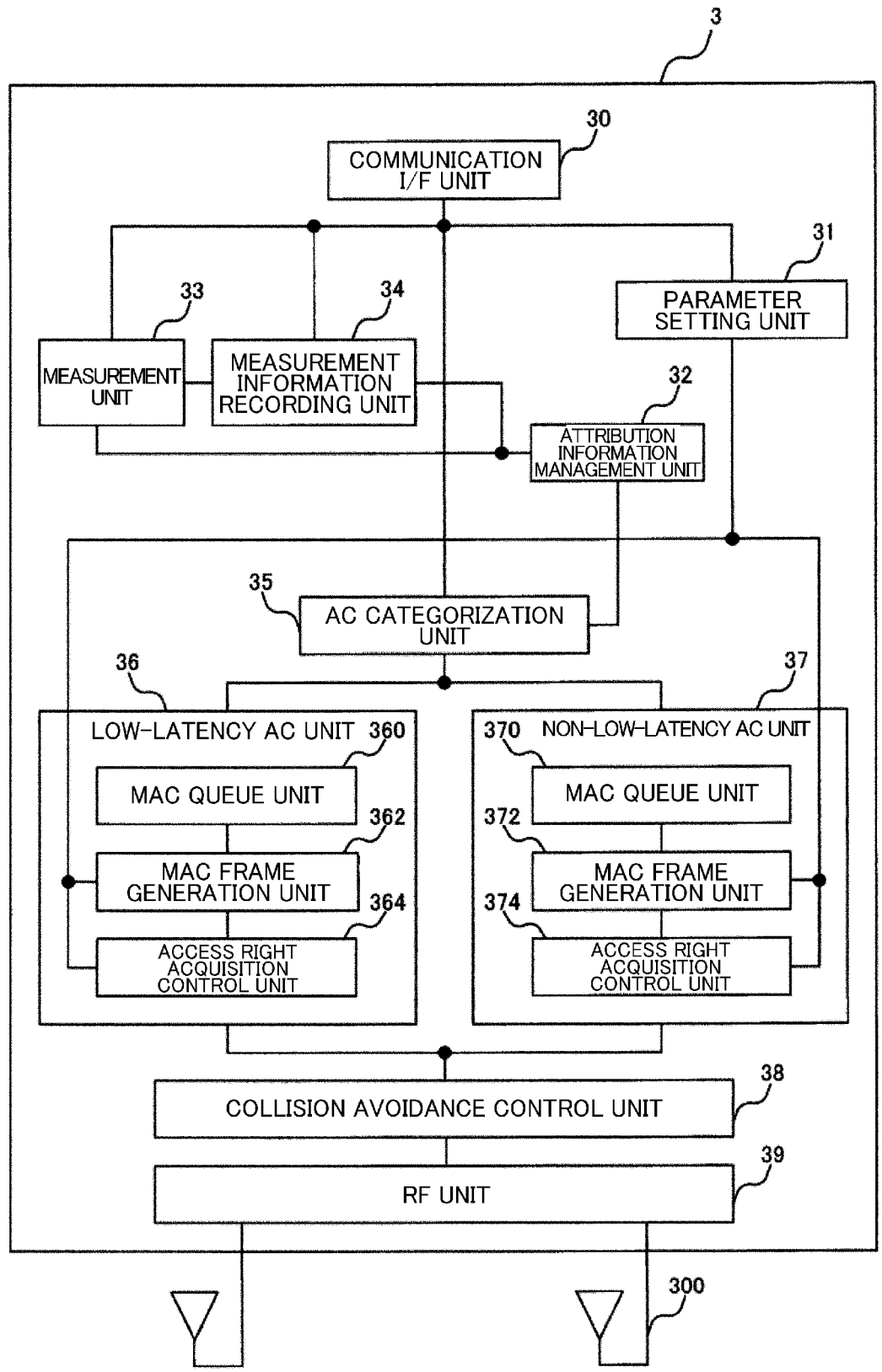
FIG. 3 is a diagram illustrating an example of a configuration of each of wireless base stations according to the embodiment.

FIG. 3 illustrates an example of a configuration of each of the wireless base stations 3 according to the embodiment. As illustrated in FIG. 3, the wireless base station 3 includes a communication I/F unit 30, a parameter setting unit 31, an attribution information management unit 32, a measurement unit 33, a measurement information recording unit 34, an AC categorization unit 35, a low-latency AC unit 36, a non-low-latency AC unit 37, a collision avoidance control unit 38, an RF unit 39, and an antenna unit 300.

The communication I/F unit 30 is an interface that performs transmission/reception to/from the central control station 2 via the network 10 (FIG. 1). For example, the communication I/F unit 30 transmits/receives, to/from the central control station 2, the information related to the wireless communication such as the communication quality measurement information and the attribution information representing attribution of the wireless terminals 4 to the wireless base stations 3 as well as the wireless LAN parameters.

The parameter setting unit 31 sets the wireless LAN parameters based on the wireless LAN parameters received from the central control station 2 via the communication I/F unit 30. For example, the parameter setting unit 31 converts the wireless LAN parameters received from the central control station 2 to a mode in which the wireless LAN parameters are settable to each of the low-latency AC unit 36 and the non-low-latency AC unit 37 to set the wireless LAN parameters thereto.

In a specific example, when a latency in the transmission of the prioritized frames due to the transmission of the non-prioritized frames is not expected based on quality measurement information measured by a measurement unit 33 described later, the parameter setting unit 31 makes settings such that the channel use period (TxOP Limit) for the transmission of the non-priority frames is changed to be longer. Meanwhile, when a latency in the transmission of the prioritized frames due to the transmission of the non-prioritized frames is expected based on the quality measurement information measured by the measurement unit 33, the parameter setting unit 31 makes settings such that the channel use period for the transmission of the non-priority frames is limited to be equal to or shorter than a predetermined period and a limit to the number of frames that can be transmitted within the channel use period is eliminated.

The attribution information management unit 32 registers and manages the attribution information of the attributed wireless terminals 4 including an ID (such as a MAC address) of each of the attributed wireless terminals 4 and information on the AC requested by the wireless terminal 4.

The measurement unit 33 measures and collects scan information (BSSID (Basic Service Set ID), CH (Channel), and RSSI (Received Signal Strength Indication)) obtained by scanning a surrounding interfering AP (interfering wireless base station 3) and wireless communication measurement information (the quality measurement information) related to a quality of wireless communication including signals respectively representing an average packet size of the attributed wireless terminals 4, an average required data rate thereof, an average wireless transmission rate thereof, and an average use wireless LAN standard and the like. It may also be possible to use, as the quality measurement information related to the quality, all measurable information sets that affect the quality including a traffic of the wireless communication.

The measurement information recording unit 34 records the attribution information (including information on the ACs) to be managed by the attribution information management unit 32 and the wireless communication measurement information measured by the measurement unit 33 in association with each other. Note that recorded information in which the attribution information and the wireless communication measurement information are associated with each other and which is recorded in the measurement information recording unit 34 is simultaneously transmitted also to the central control station 2 from, e.g., the attribution information management unit 32 via the communication I/F unit 30 and used also in each of the low-latency AC unit 36 and the non-low-latency AC unit 37.

The AC categorization unit 35 performs categorization of the ACs based on the attribution information managed by the attribution information management unit 32 and destinations of arriving frames. Specifically, the AC categorization unit 35 categorizes frames arriving from a higher-level layer into either of a low-latency AC and a non-low-latency AC and outputs each of the categorized frames to either of the low-latency AC unit 36 and the non-low-latency AC unit 37. For example, the AC categorization unit 35 outputs AC_VO and AC_VI frames as the prioritized frames to the low-latency AC unit 36 and outputs AC_BE and AC_BK frames as the non-prioritized frames to the non-low-latency AC unit 37.

The low-latency AC unit 36 has a MAC queue unit 360, a MAC frame generation unit 362, and an access right acquisition control unit 364 and processes the AC frames categorized by the AC categorization unit 35 into the low-latency AC.

The MAC queue unit 360 stores the AC frames arriving from the higher-level layer and categorized by the AC categorization unit 35 into the low-latency AC.

The MAC frame generation unit 362 converts, based on the wireless LAN parameters set by the parameter setting unit 31 and the information recorded in the measurement information recording unit 34, the frames stored by the MAC queue unit 360 into a continuous frame and performs fragmentation processing to generate MAC frames.

The access right acquisition control unit 364 outputs, based on the wireless LAN parameters set by the parameter setting unit 31, the MAC frames generated by the MAC frame generation unit 362 with predetermined access timing depending on the channel use period.

The non-low-latency AC unit 37 includes a MAC queue unit 370, a MAC frame generation unit 372, and an access right acquisition control unit 374 and processes the AC frames categorized by the AC categorization unit 35 into the non-low-latency AC.

The MAC queue unit 370 stores the AC frames arriving from the higher-level layer and categorized by the AC categorization unit 35 into the non-low-latency AC.

The MAC frame generation unit 372 converts, based on the wireless LAN parameters set by the parameter setting unit 31 and the information recorded by the measurement information recording unit 34, the frames stored by the MAC queue unit 370 to the continuous frame and performs the fragmentation processing to generate the MAC frames.

In a specific example, the MAC frame generation unit 372 permits continuous transmission of the non-prioritized frames within the channel use period set by the parameter setting unit 31 and performs the fragmentation processing on, e.g., the non-prioritized frames to generate the MAC frames.

The access right acquisition control unit 374 outputs, based on the wireless LAN parameters set by the parameter setting unit 31, the MAC frames generated by the MAC frame generation unit 372 with predetermined access timing depending on the channel use period.

The collision avoidance control unit 38 performs control to avoid an access right collision or conflict by using the CSMA/CA. For example, the collision avoidance control unit 38 performs the control to avoid the access right collision so as to transmit the frames output from the low-latency AC unit 36 or the non-low-latency AC unit 37 via the RF unit 39 and the antenna unit 300.

The RF unit 39 processes a radio frequency (RF) signal transmitted/received by the antenna unit 300.

When each of the wireless base stations 3 includes a plurality of the collision avoidance control units 38, it can be considered that an access timing collision occurs between the collision avoidance control units 38. In this case, the wireless base station 3 may also be configured such that, in a stage subsequent thereto, a collision avoidance control unit is further provided in transversely continued relation to the wireless base station 3 for the purpose of intentionally shifting access timing and avoiding an access timing collision in the wireless base station 3.

Thus, the wireless base station 3 is a wireless communication device that transmits/receives a radio wave according to a predetermined standard via the antenna unit 300 and performs wireless communication with the wireless terminal 4. For example, the wireless base station 3 transmits, to the wireless terminal 4 and via the antenna unit 300, a frame that can be transmitted within the channel use period (TxOP Limit) during which exclusive use of the channel after an access right to access the channel is acquired is permitted.

Figure 4:
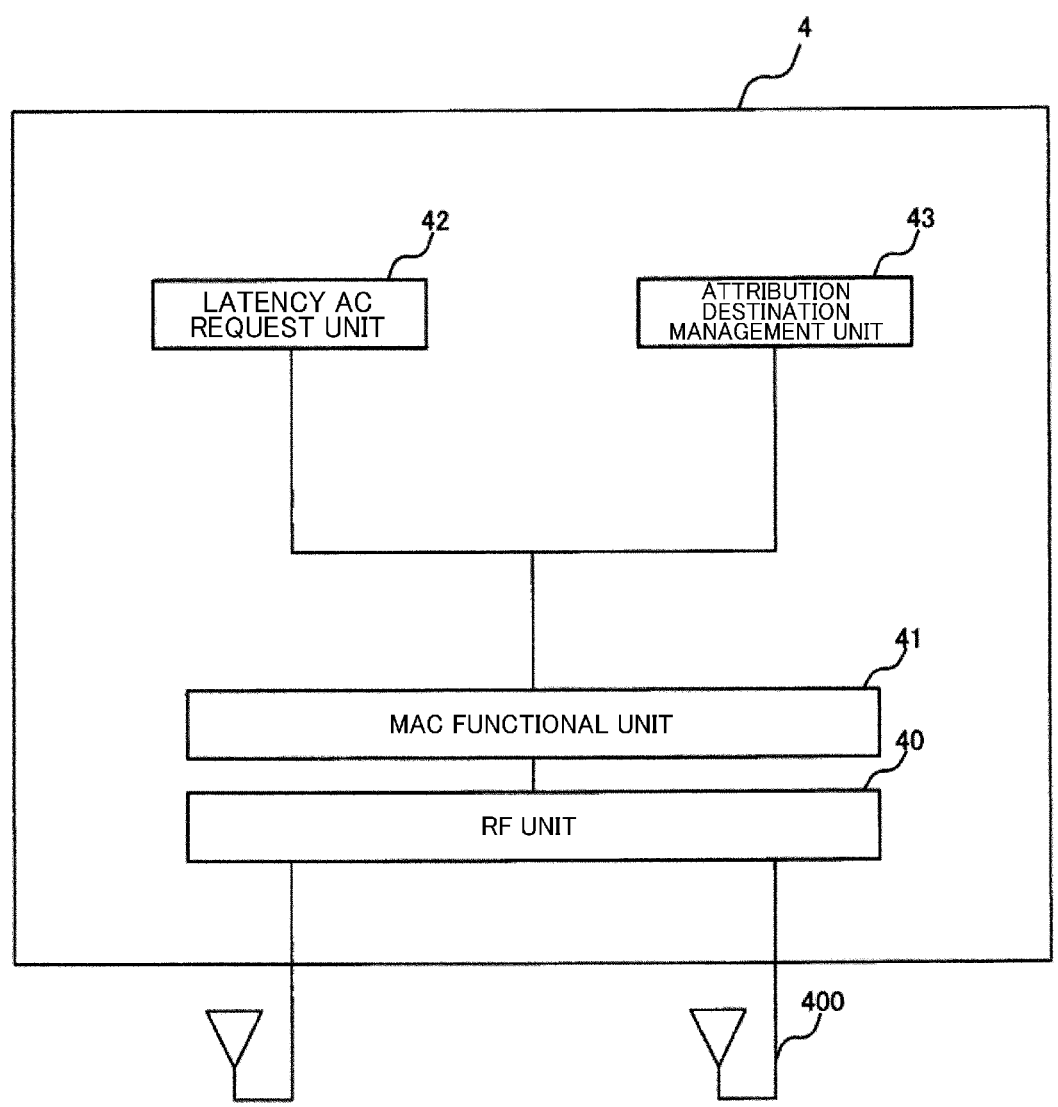
FIG. 4 is a diagram illustrating an example of a configuration of each of wireless terminals according to the embodiment.

FIG. 4 illustrates an example of a configuration of each of the wireless terminals 4 according to the embodiment. As illustrated in FIG. 4, the wireless terminal 4 includes an antenna unit 400, an RF unit 40, a MAC functional unit 41, a latency AC request unit 42, and an attribution destination management unit 43. The wireless terminal 4 is a wireless communication device that transmits/receives a radio wave according to a predetermined standard via the antenna unit 400 and performs wireless communication with the wireless base station 3.

The RF unit 40 processes the radio frequency signal transmitted/received by the antenna unit 400. The MAC functional unit 41 has a function of wireless communication media access control.

The latency AC request unit 42 notifies the wireless base station 3 to which the wireless terminal 4 intends to be attributed of the AC via the MAC functional unit 41, the RF unit 40, and the antenna unit 400. The attribution destination management unit 43 manages management information of the wireless base station 3 after the attribution is established.

Next, using FIGS. 5 to 10, a description will be given of a specific operation of the wireless communication system 1.

Figure 5:
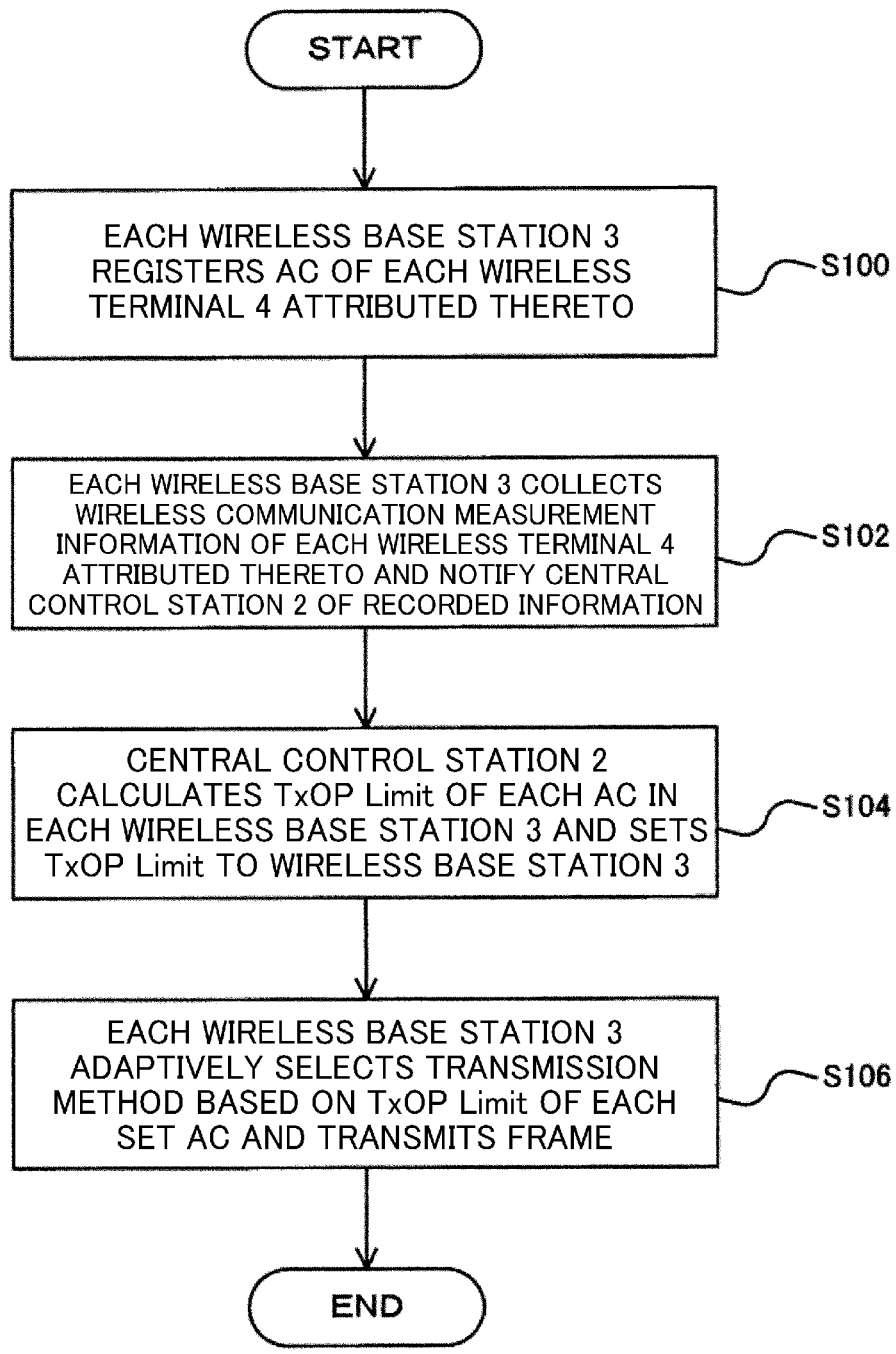
FIG. 5 is a flow chart illustrating, by way of example, an outline of an operation of the wireless communication system.

FIG. 5 is a flow chart illustrating, by way of example, an outline of an operation of the wireless communication system 1. As illustrated in FIG. 5, first, each of the wireless base stations 3 registers the AC of the wireless terminal 4 attributed thereto (S100). Then, each of the wireless base stations 3 collects the wireless communication measurement information from the wireless terminal 4 attributed thereto and notifies the central control station 2 of the recorded information in which the information on the AC and the wireless communication measurement information are associated with each other (S102).

The central control station 2 calculates the TxOP Limit of each of the ACs in each of the wireless base stations 3 and sets the TxOP Limit to the wireless base station 3 (S104). Then, each of the wireless base stations 3 adaptively selects a transmission method based on the set TxOP Limit of each of the ACs and transmits the frame (S106).

Figure 6:
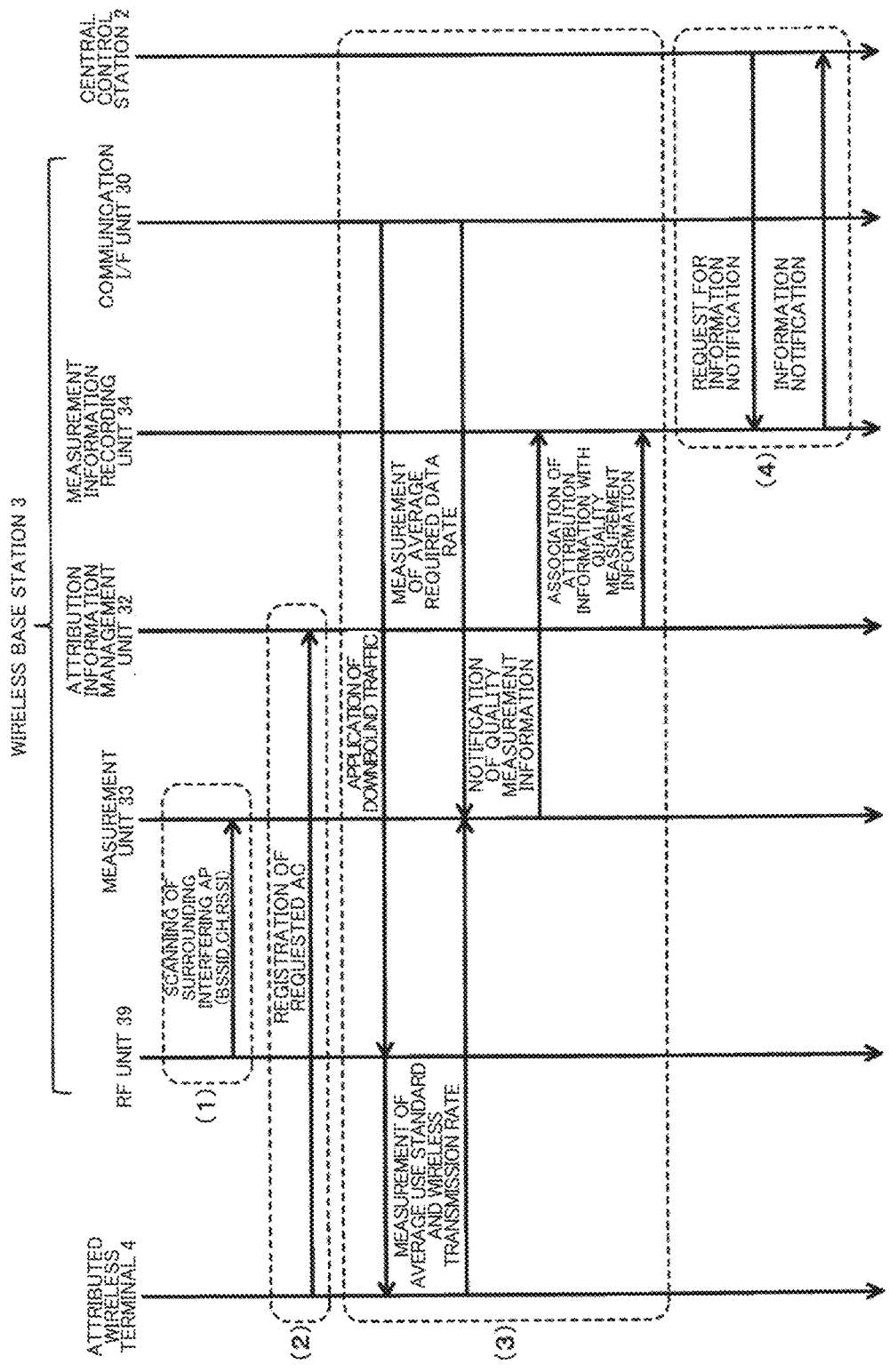
FIG. 6 is a sequence diagram illustrating a specific example of processing to be performed by each of the wireless base stations.

FIG. 6 is a sequence diagram illustrating a specific example of processing in S100 and S102 to be performed by each of the wireless base stations 3 illustrated in FIG. 5. The processing to be performed herein by each of the wireless base stations 3 includes processing steps (1) to (4).

The processing step (1) is a processing step of scanning the surrounding interfering AP (interfering wireless base station 3). The processing step (2) is a processing step of registering, in the wireless base station 3, the AC requested by the wireless terminal 4 attributed thereto.

The processing step (3) is a processing step of actually applying a traffic to the wireless terminal 4 subjected to the processing step (2), performing detection of the average use wireless LAN standard, measurement of a wireless transmission rate, measurement of an average required data rate, and the like, and collecting the wireless communication measurement information (quality measurement information). The quality measurement information is associated with the attribution information (such as the ID (such as the MAC address) of each of the wireless terminals 4 and information on the AC requested by each of the wireless terminals 4) managed by the attribution information management unit 32, and managed as the recorded information.

The processing step (4) is a processing step in which the wireless base station 3 notifies the central control station 2 of the information obtained as a result of the processing steps (1) and (3). The wireless base station 3 performs information notification in response to an information notification request from the central control station 2.

Note that each of the processing steps (1) and (4) is performed with a given period irrespective of a situation of the wireless terminal 4. The processing step (2) is performed once when the wireless terminal 4 is connected to the wireless base station 3. The processing step (3) is performed with a given period, while the wireless terminal 4 is allowing the traffic to flow, to update the recorded information.

Next, using FIGS. 7 to 10, a description will be given of a specific example of processing (frame transmission processing) in S106 to be performed by each of the wireless base stations 3.

Figure 7:
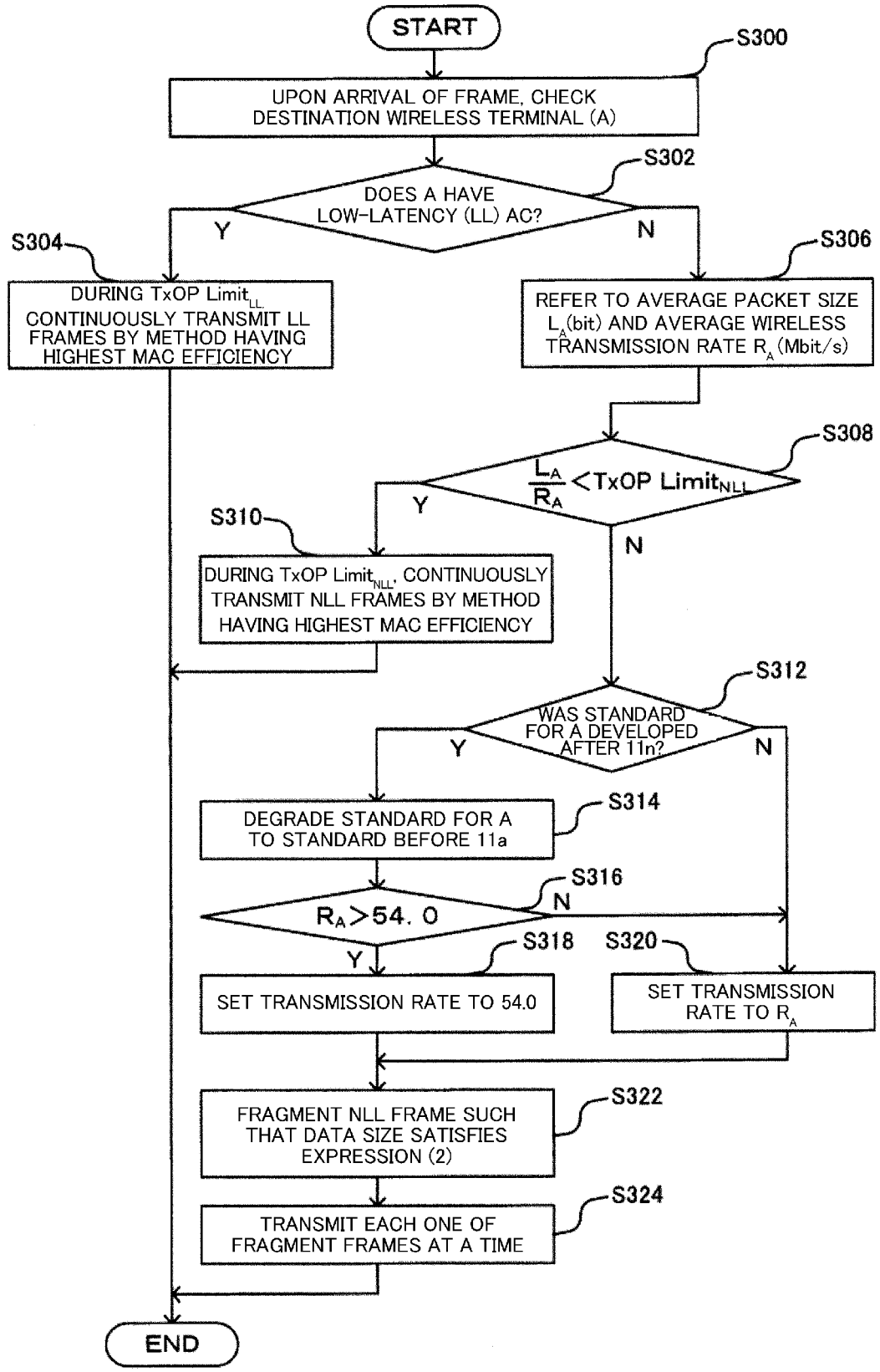
FIG. 7 is a flow chart illustrating the specific example of the processing to be performed by each of the wireless base stations.

FIG. 7 is a flow chart illustrating a specific example of the processing (frame transmission processing) in S106 to be performed by each of the wireless base stations 3 illustrated in FIG. 5. To apply processing defined in an existing wireless LAN, supplementary notes will be shown first.

Figure 8:
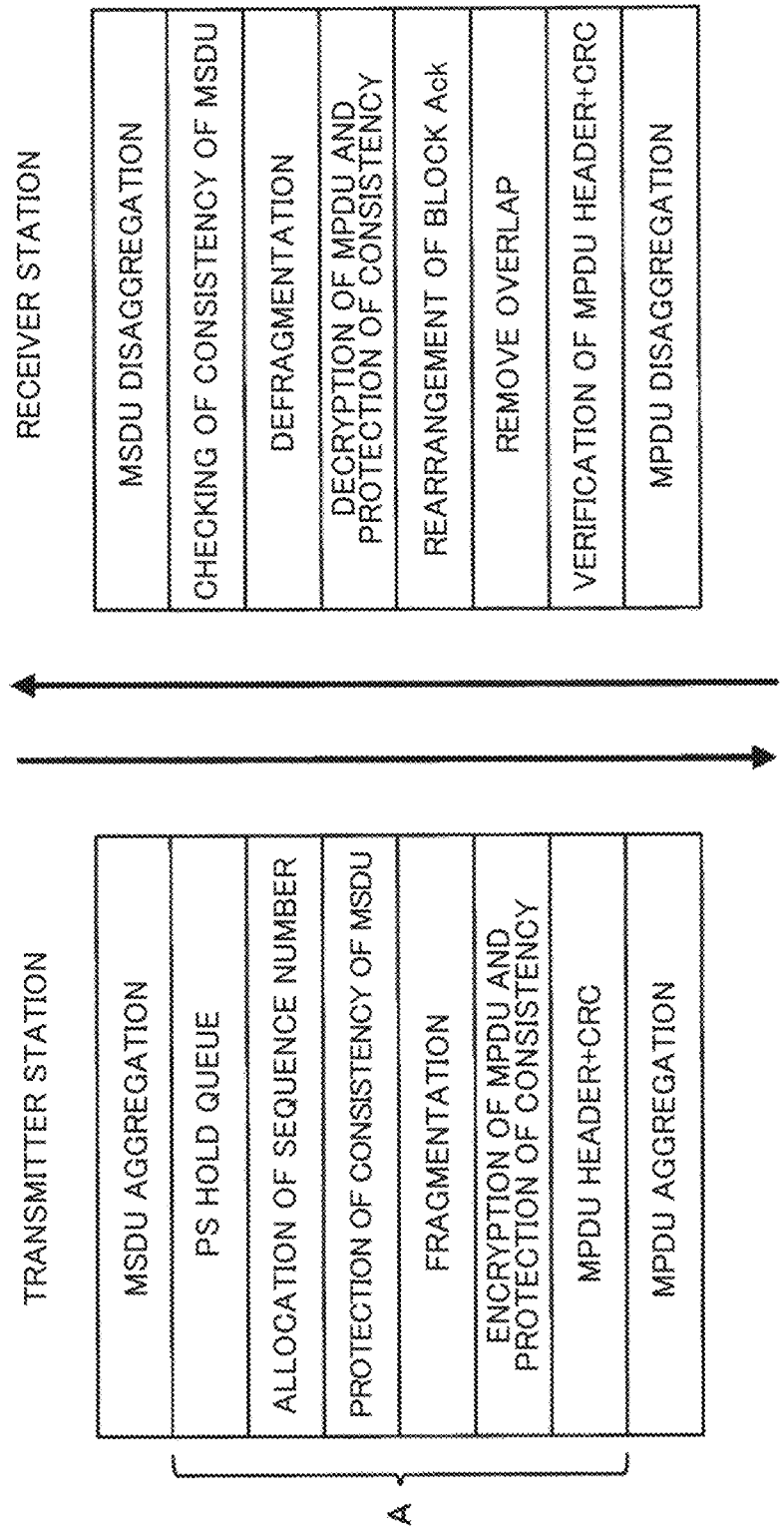
FIG. 8 is a diagram illustrating processing to be performed by a transmitter station and a receiver station in a wireless LAN.

FIG. 8 uses an arrangement of functional blocks to represent processing to be performed by a transmitter station and a receiver station in the wireless LAN. In FIG. 8, the transmitter station causes the individual functional blocks to perform processing steps to be performed thereby in the order of top to bottom to perform transmission, while the receiver station causes the individual functional blocks to perform processing steps to be performed thereby in the order of bottom to top to perform reception. The functional blocks (A) ranging from PS HOLD QUEUE to MPDU HEADER+CRC perform the processing steps determined by standards developed before IEEE 802. 11n.

The MPDU aggregation (A-MPDU) performs generation of A-MPDU frames. The MPDU disaggregation performs the processing of separating the A-MPDU frames. As described above, the A-MPDU is the technique of joining together the MAC frames and continuously transmitting the MAC frames joined together to thus transmit a continuous frame from which ACK frames are omitted, enhance the MAC efficiency, and broaden the band.

The fragmentation performs generation of fragment frames. The defragmentation performs the processing of joining together the fragment frames. However, the fragmentation processing cannot be used simultaneously with the A-MPDU.

The fragmentation processing is a technique of dividing a frame having a large data size into a plurality of smaller frames and transmitting the smaller frames to thus intend to reduce a frame reception error rate. However, since the smaller frames resulting from the division have smaller data sizes, the fragmentation processing can also be used extensively as a technique for reducing a channel use period per frame.

The fragmentation processing, which reduces the MAC efficiency of wireless communication, has a background property of being against the direction of development of wireless LAN technology which is oriented to an improvement in the efficiency. Accordingly, mainly under the wireless LAN standards developed after IEEE 802. 11n, the fragmentation processing cannot be applied to wireless communication between transmitter/receiver stations.

Figure 9:
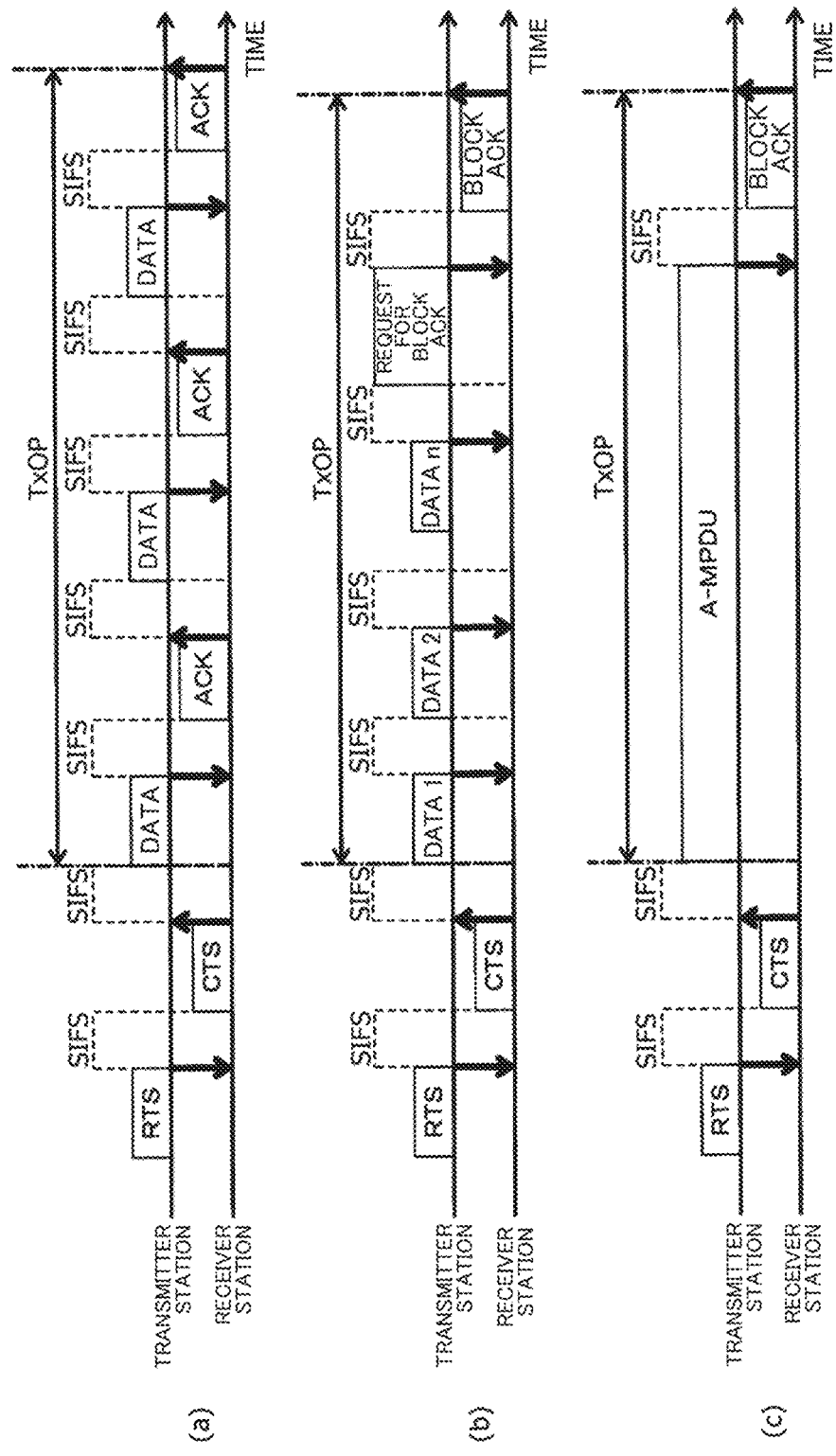
FIG. 9 is a diagram illustrating an outline of continuous frame transmission defined by the wireless LAN.

FIG. 9 illustrates an outline of continuous frame transmission defined in the A-MPDU and other wireless LANs. FIG. 9(*a*) illustrates single frame transmission defined in 802. 11b/a/g. FIG. 9(*b*) illustrates EDCA in 802. 11e. FIG. 9(*c*) illustrates the A-MPDU defined after 802. 11n.

Thus, a method of transmitting frames includes the single frame transmission illustrated in (a), 802. 11e Block data frame exchange defined in IEEE 802e. 11e and illustrated in (b), the A-MPDU illustrated in (c), and the like. In the order of (a) to (c), the number of the SIFSs between the ACK frames or between the frames is increasingly reduced to increasingly improve the MAC efficiency.

Figure 10:
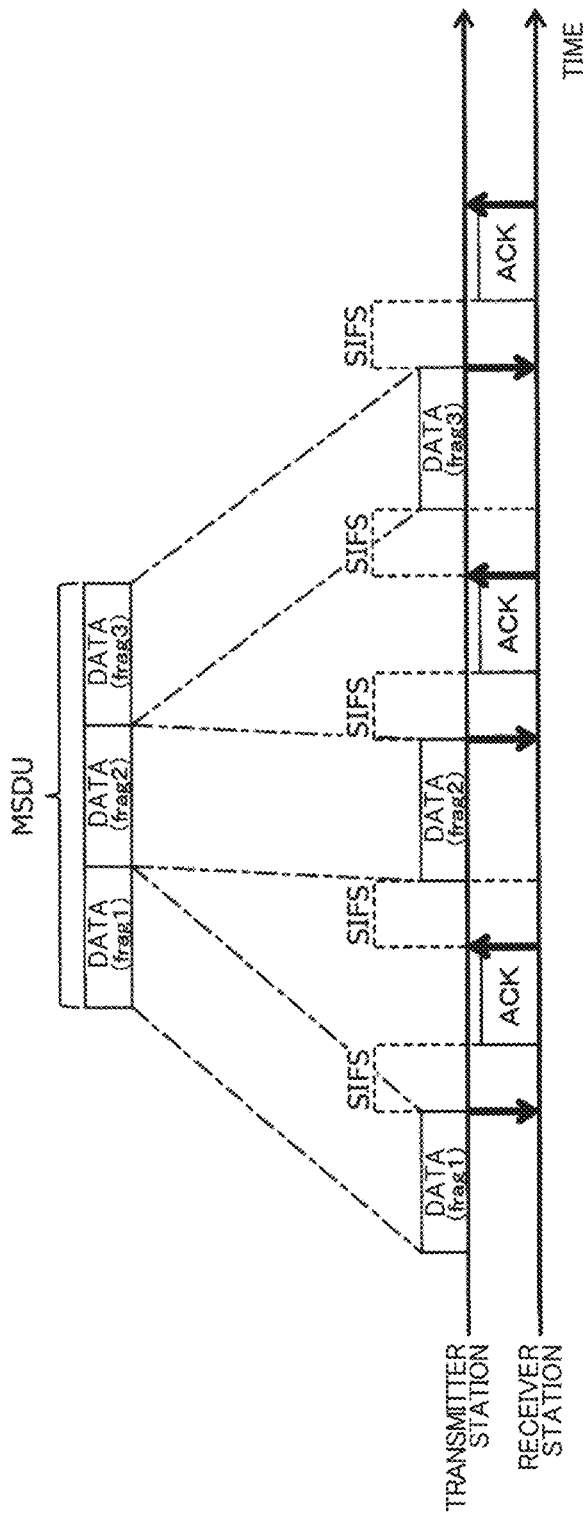
FIG. 10 is a diagram illustrating an outline of fragmentation processing.

FIG. 10 illustrates an outline of the fragmentation processing. The fragmentation processing is processing of dividing a frame into a plurality of smaller frames and transmitting the smaller frames.

A description will be given below of processing to be performed by the wireless base station 3 illustrated in FIG. 7 by using the frame transmission processing defined in the wireless LAN illustrated in FIGS. 8 to 10.

Note that, in the wireless base station 3, when the processing (frame transmission processing) in S106 illustrated in FIG. 5 is to be performed, under the control of the central control station 2, the TxOP Limit (hereinafter referred to as TxOP Limit$_{LL}$) for the low-latency AC unit 36 is set and the TxOP Limit (hereinafter referred to as TxOP Limit$_{NLL}$) for the non-low-latency AC unit 37 is set.

Specifically, the TxOP Limit$_{LL}$ is set for each of the MAC frame generation unit 362 and the access right acquisition control unit 364, while the TxOP Limit$_{NLL}$ is set for each of the MAC frame generation unit 372 and the access right acquisition control unit 374.

In addition, the TxOP Limit$_{NLL}$ is determined based on a traffic of each of the wireless terminals 4 that are transmitting frames (prioritized frames) in the higher-priority ACs.

For example, when the traffic of each of the wireless terminals 4 that are transmitting the prioritized frames is heavy, to avoid exclusive use of the channel by the wireless terminals 4 that transmit frames (non-prioritized frames) in the lower-priority ACs, the TxOP Limit$_{NLL}$ is preferably set to a shorter period.

Meanwhile, when the traffic of each of the wireless terminals 4 that are transmitting the prioritized frames is light, to process a traffic of each of the wireless terminals 4 that transmit the non-priority frames ahead of time in preparation for a future traffic increase, the TxOP Limit$_{NLL}$ is preferably set to a longer period.

In the operation shown below, when a plurality of the frames can be transmitted within the set TxOP Limit$_{NLL}$ the frames are collectively transmitted and, when one frame cannot be transmitted within the set TxOP Limit$_{NLL}$ the frame is fragmented.

As illustrated in FIG. 7, when the frame arrives from the higher-level layer, the AC categorization unit 35 (FIG. 3) first checks the destination wireless terminal 4 (hereinafter referred to as A) thereof (S300).

Then, the AC categorization unit 35 checks the AC of the A and determines whether or not the AC is the low-latency (LL) AC (S302).

When the AC of the A is the low-latency AC, the MAC frame generation unit 362 of the low-latency AC unit 36 selects, from among frame transmission methods illustrated in FIG. 9, the frame transmission method to which the A corresponds and which has the highest MAC efficiency and continuously transmits the low-latency frames (LL frames) during the TxOP Limit$_{LL}$ (S304). It is assumed that the processing in steps including and subsequent to S304 is performed after the frames pass through the MAC queue of each of the ACs and reaches the access right acquisition control unit 364 or the access right acquisition control unit 374.

When the AC of the A is the non-low-latency (NLL) AC, the MAC frame generation unit 372 of the non-low-latency AC unit 37 refers to an average packet size $L_A$ (bit) and an average wireless transmission rate $R_A$ (Mbit/s) each related to the A recorded in the measurement information recording unit (S306).

Then, the MAC frame generation unit 372 determines whether or not Expression (1) shown below is satisfied (S308).

[Math. 1]

$$\frac{L_A}{R_A} < T \times OP\ Limit_{NLL} \qquad (1)$$

When Expression (1) is satisfied, the MAC frame generation unit 372 selects, from among the frame transmission methods illustrated in FIG. 9, the frame transmission method to which the A corresponds and which has the highest MAC efficiency and continuously transmits the non-low-latency frames (NLL frames) during the TxOP Limit$_{NLL}$ (S310).

When Expression (1) is not satisfied, the MAC frame generation unit 372 determines whether or not a wireless LAN standard for the A was developed after IEEE 802. 11n (S312).

When determining that the wireless LAN standard for the A was developed after IEEE 802. 11n, the MAC frame generation unit 372 degrades a wireless LAN standard to be used for transmission of frames addressed to the A to, e.g., a standard before IEEE 802. 11a (S314).

Then, the MAC frame generation unit 372 determines whether or not the average wireless transmission rate has a value larger than 54 (Mbit/s) (S316).

When the average wireless transmission rate has a value larger than 54 (Mbit/s), the MAC frame generation unit 372 makes such settings as to degrade the wireless transmission rate to 54.0 Mbit/s, which is a highest wireless transmission rate defined by IEEE 802. 11a or the like (S318).

When the average wireless transmission rate is equal to or lower than 54 (Mbit/s), the MAC frame generation unit 372 makes such settings as to set the wireless transmission rate to $R_A$ (S320). Meanwhile, even when determining that the wireless LAN standard for the A was not developed after IEEE 802. 11n in the processing in S312, the MAC frame generation unit 372 does not change the settings and sets the transmission rate to $R_A$, since the standard for the A is already older than IEEE 802. 11a or the like (S320).

The MAC frame generation unit 372 fragments the NLL frame such that a data size after the fragmentation processing satisfies Expression (2) shown below (S322).

[Data size(bit)]=[Transmission rate]×([*TxOP* Limit$_{NLL}$]−[SIFS period]−[ACK period])−[Fragment frame header size]     [Math. 2]

Then, the MAC frame generation unit 372 causes each one of the fragment frames to be transmitted at a time (S324). It is arranged herein that a position of the current block is maintained until all the fragment frames are transmitted by a plurality of accesses.

The wireless base station 3 transmits the frames addressed to the A based on the wireless LAN standard, the wireless transmission rate, the data size after the fragmentation processing each calculated as described above. When the number of the frames after the fragmentation processing becomes plural, the wireless base station 3 takes over the settings even for wireless LAN communication of a second and subsequent frames.

Thus, the wireless communication system 1 includes the central control station 2 and collects the wireless communication measurement information from a group of the wireless base stations 3 under the central control station 2 to calculate and set the value of the TxOP Limit which is one of the EDCA parameters of the low-latency/non-low-latency ACs of the group of wireless base stations 3.

The group of wireless base stations 3 control the continuous frame transmission of the frames and the fragmentation processing based on the set value of the TxOP Limit to improve the band of the non-low-latency traffic when the low-latency traffic is not tight and maximally suppress the band of the non-low-latency traffic when the low-latency traffic is tight. Consequently, the wireless communication system 1 obtains the following two effects.

The first effect is that, by elongating the TxOP Limit of the non-low-latency AC when the low-latency traffic is not tight and permitting the continuous frame transmission of the A-MPDU frames or the like, the wireless communication system 1 can improve the band of the non-low-latency traffic without aggravating a queuing latency in the low-latency communication.

The second effect is that, when the low-latency traffic is tightened, the wireless communication system 1 indicates the TxOP Limit of the non-low-latency AC by using a non-zero time value, while the wireless base station 3 performs the fragmentation processing on the non-lowlatency frames, to thus allow overloading of the band by the non-low-latency traffic to be maximally suppressed.

REFERENCE SIGNS LIST

1 Wireless communication system
2 Central control station
3 Wireless base station
4 Wireless terminal
10 Network
20 Communication I/F unit
21 Information collection unit
22 Information recording unit
23 Parameter calculation unit
24 Algorithm parameter recording unit
25 Parameter setting unit
26 Parameter recording unit
30 Communication I/F unit
31 Parameter setting unit
32 Attribution information management unit
33 Measurement unit
34 Measurement information recording unit
35 AC categorization unit
36 Low-latency AC unit
360 MAC queue unit
362 MAC frame generation unit
364 Access right acquisition control unit
37 Non-low-latency AC unit
370 MAC queue unit
372 MAC frame generation unit
374 Access right acquisition control unit
38 Collision avoidance control unit
39 RF unit
40 RF unit
41 MAC functional unit
42 Latency AC request unit
43 Attribution destination management unit

The invention claimed is:

1. A wireless communication system for performing priority control, the wireless communication system comprising:
   a measurement unit, including one or more computers, configured to collect quality measurement information related to a quality of wireless communication;
   a parameter setting unit, including one or more computers, configured to, when a latency in transmission of a prioritized frame due to transmission of a non-prioritized frame is not expected based on the quality measurement information collected by the measurement unit, increase a channel use period for the transmission of the non-prioritized frame; and
   a media access control (MAC) frame generation unit, including one or more computers, configured to:
      obtain, from the quality measurement information, an average packet size and an average wireless transmission rate of a destination terminal of the non-prioritized frame;
      determine that a ratio of the average packet size to the average wireless transmission rate is greater than or equal to the channel use period set by the parameter setting unit for transmitting the non-prioritized frame;
      in response to determining that the ratio is greater than or equal to the channel use period, determine whether a wireless LAN standard for the destination terminal was identified as a standard after the 802.11n standard;
      in response to determining that the wireless LAN standard for the destination terminal was identified as a standard after the 802.11n standard, downgrade the wireless LAN standard of the destination terminal to a standard developed before IEEE 802.11a was designated a standard communications protocol, and set a transmission rate for transmitting the non-prioritized frame to a predefined value; and
      in response to determining that the wireless LAN standard for the destination terminal was not developed after IEEE 802.11n was designated a standard communications protocol, set the transmission rate for transmitting the non-prioritized frame to the average wireless transmission rate specified in the quality measurement information.

2. The wireless communication system according to claim 1, wherein the MAC frame generation unit is further configured to, in response to determining that the ratio is greater than or equal to the channel use period and after setting the transmission rate for transmitting the non-prioritized frame, perform fragmentation processing on the non-prioritized frame.

3. The wireless communication system according to claim 1, wherein the measurement unit is configured to measure, as the quality measurement information, information including at least any of signals respectively representing a surrounding interfering wave, an average packet size of transmission data, an average required data rate thereof, an average wireless transmission rate thereof, and a communication standard.

4. A wireless communication method for performing priority control, the wireless communication method comprising:
   collecting quality measurement information related to a quality of wireless communication;
   increasing, when a latency in transmission of a prioritized frame due to transmission of a non-prioritized frame is not expected based on the collected quality measurement information, a channel use period for the transmission of the non-prioritized frame;
   obtaining, from the quality measurement information, an average packet size and an average wireless transmission rate of a destination terminal of the non-prioritized frame;
   determining that a ratio of the average packet size to the average wireless transmission rate is greater than or equal to the channel use period that has been set for transmitting the non-prioritized frame;
   in response to determining that the ratio is greater than or equal to the channel use period, determining whether a wireless LAN standard for the destination terminal was identified as a standard after the 802.11n standard;
   in response to determining that the wireless LAN standard for the destination terminal was identified as a standard after the 802.11n standard, downgrading the wireless LAN standard of the destination terminal to a standard developed before IEEE 802.11a was designated a standard communications protocol, and setting a transmission rate for transmitting the non-prioritized frame to a predefined value; and
   in response to determining that the wireless LAN standard for the destination terminal was not identified as a standard after the 802.11n standard, setting the transmission rate for transmitting the non-prioritized frame to the average wireless transmission rate specified in the quality measurement information.

5. The wireless communication method according to claim 4, further comprising:

in response to determining that the ratio is greater than or equal to the channel use period and after setting the transmission rate for transmitting the non-prioritized frame, performing fragmentation processing on the non-prioritized frame.

6. The wireless communication method according to claim 4, wherein collecting quality information measurement information includes measuring, as the quality measurement information, information including at least any of signals respectively representing a surrounding interfering wave, an average packet size of transmission data, an average required data rate thereof, an average wireless transmission rate thereof, and a communication standard.

\* \* \* \* \*